United States Patent [19]
Spisak

[11] 4,316,638
[45] Feb. 23, 1982

[54] WHEEL TRIM

[76] Inventor: Edward G. Spisak, 35700 Oakwood La., Westland, Mich. 48185

[21] Appl. No.: 170,580

[22] Filed: Jul. 21, 1980

[51] Int. Cl.³ .............................................. B60B 7/00
[52] U.S. Cl. .............................. 301/37 P; 301/108 S; 301/37 S
[58] Field of Search ................ 301/37 R, 39 P, 37 C, 301/37 CD, 37 S, 108 R, 108 A, 108 S; 24/288, 289, 295

[56] References Cited

U.S. PATENT DOCUMENTS

| | | | |
|---|---|---|---|
| 181,541 | 8/1876 | Sanderson | 301/108 R |
| 2,217,086 | 10/1940 | Whitacre | 301/37 R |
| 4,123,111 | 10/1978 | Renz et al. | 301/37 S |

FOREIGN PATENT DOCUMENTS 2111187 10/1971 Fed. Rep. of Germany ... 301/108 S

*Primary Examiner*—H. Grant Skaggs
*Attorney, Agent, or Firm*—Fisher, Gerhardt, Crampton & Groh

[57] ABSTRACT

A wheel trim assembly including metal retainers for bitingly engaging the sides of wheel attaching nuts to maintain the wheel trim in position on the wheel wherein metallic retaining members are supported within a plastic hubcap by the resiliency of the retaining members acting to limit radial and axial movement relative to the ornamental cap in both its mounted and unmounted condition.

10 Claims, 5 Drawing Figures

WHEEL TRIM

This invention relates to decorative wheel trim assemblies for use on automobile vehicle wheels and more particularly to a retaining arrangement for holding the wheel trim assembly on the wheel.

Wheel trim such as ornamental caps sometimes called hubcaps which are used to cover a portion of the wheel are difficult to maintain in position on the wheel is subject to complex loading and stresses to temporarily deform the wheel during operation on road surfaces. In addition the wheel trim itself must support retainers for holding the wheel trim in position during all operating conditions. Such retainers are subject to high loads which are transferred to the fastening arrangements by which the retainers are mounted on the wheel trim. The problem is particularly aggravated when the wheel trim is made of plastic material which often requires the use of special fasteners to secure the retaining system relative to the wheel trim member.

It is an object of the invention to provide a retainer arrangement for wheel trim wherein the resiliency of the retainers is used not only to hold the wheel trim relative to the wheel but also to hold the retainer elements in position relative to the wheel trim.

The wheel trim embodying the invention includes a cup-shaped trim member made of plastic material and is provided with retaining elements made of spring-like metal. The trim member is adapted for connection to a vehicle wheel having an outer face with a plurality of uniformly spaced wheel securing fasteners located on a circle coaxial with the wheel. The cup-shaped trim member is provided with a plurality of radially extending openings corresponding to the number of wheel securing fasteners or nuts. Associated with each of the radially extending openings is an axial opening or pocket formed on the inside wall of the cup-shaped member. The pocket receives the shank of a metal retaining element which has a portion extending radially through the corresponding radial opening to limit axial movement of the retaining element and also is provided with a blade portion to bitingly engage the wheel fastener. The flexibility of the retaining element permits the retaining element to be placed in position during assembly and resists removal thereby insuring that the retaining element stays in position relative to the trim member in both the mounted and unmounted position of the latter.

These and other objects of the invention will become more apparent from the following description of the two embodiments of the invention and from the drawings in which.

Figure 1:
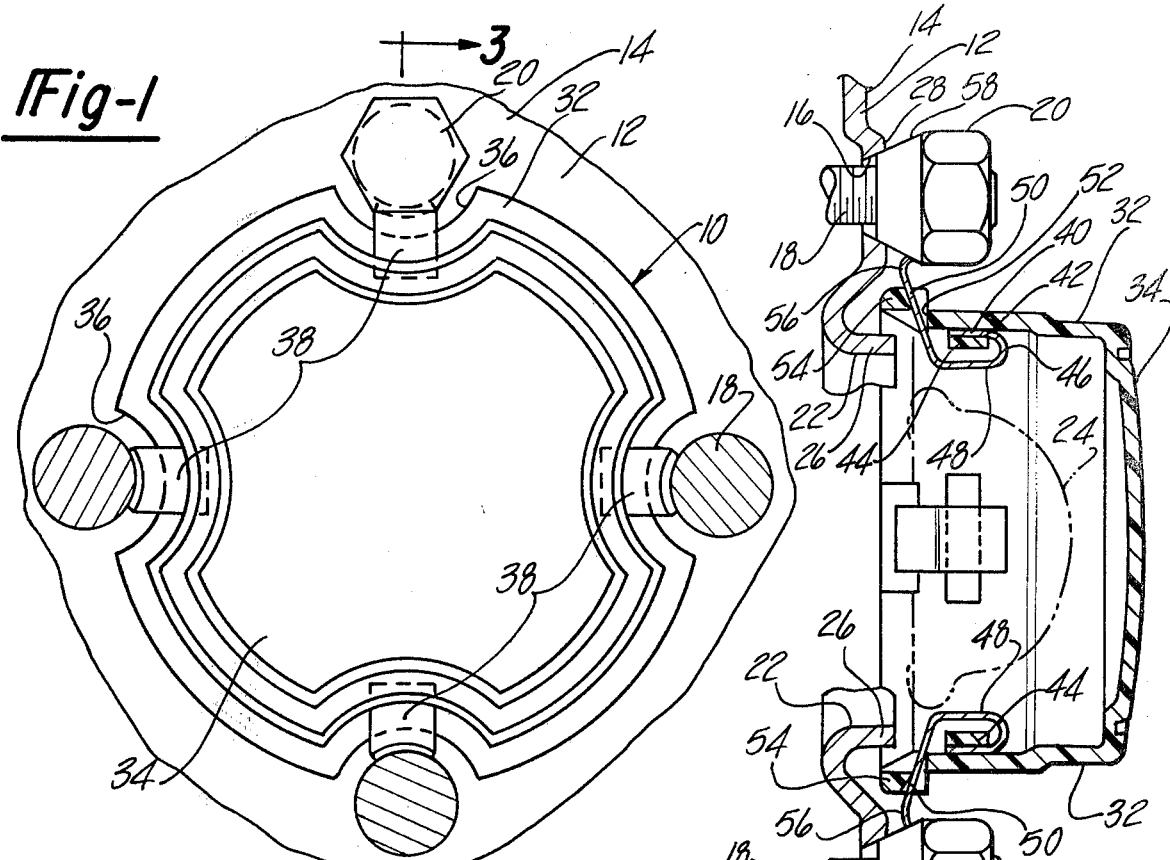
FIG. 1 is a plan view of the exterior of a wheel trim assembly embodying the invention shown in position relative to a vehicle wheel only a part of which is shown.
Figure 3:
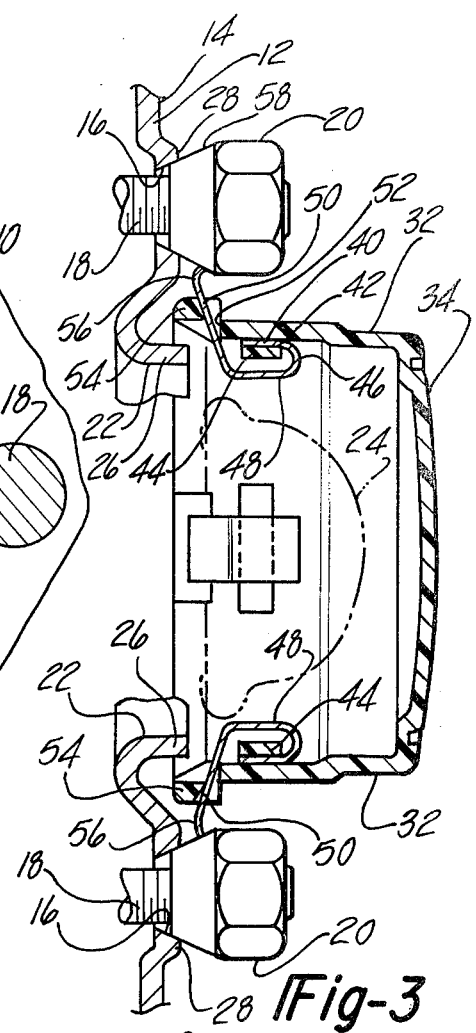
FIG. 3 is a cross-sectional view taken on line 3—3 in FIG. 1.

A wheel trim assembly embodying the invention is designated generally at 10 and is adapted for connection to the outboard side of a vehicle wheel 12 only a portion of which is indicated in FIGS. 1 and 3. The wheel 12 is of the usual automotive vehicle type having a spider or disc portion 14 with a plurality of stud receiving openings 16 through which studs 18 extend to receive wheel fastening nuts 20. Such fastening of a vehicle wheel to a hub is conventional. The stud receiving openings 16 are disposed on a bolt circle concentric with an opening 22. The opening 22 is in alignment with an axle portion, not shown, the end of which is conventionally covered with a grease cap indicated at 24. The opening 22 is surrounded by an axially extending annular flange 26 and each of the stud openings 16 radially outwardly of the flange 26 is formed in a pad 28 elevated slightly in an axial direction relative to the surrounding face portions of the wheel spider or disc 14.

The wheel trim assembly 10 includes a generally cup-shaped cap 32 preferably made of plastic material and having an ornamental outer surface 34. The cap 32 is intended to be disposed coaxially of the wheel 12 to cover the grease cap 24 and the annular flange 26 of the wheel 12. The cap 32 is provided with cutouts or recesses 36 corresponding to the number of wheel fastening nuts 20. The cutouts 36 afford clearance making it possible to give the wheel trim assembly 10 a larger overall diameter and act as means to prevent indexing or rotation of the wheel trim assembly 10 relative to the wheel 12.

The means by which the cap 32 is held securely but detachably relative to the wheel 12 is in the form of a plurality of retaining members 38, one of which is associated with each of the wheel nuts 20. Each retaining member 38 has a shank portion 40 which extends axially of the wheel 12 and is disposed in an axially extending opening or pocket formed in a protruding portion 44 molded integrally with an interior wall of the cap 32. The retaining members are bent at 46 to form an axially extending leg portion 48 from which a radial finger portion 50 extends. The finger 50 passes through an opening 52 formed in a lip 54 defining the opening to the cap 32. The protruding portion 44 with the associated pocket 42 and opening 52 can be considered as a mounting station for one retaining member 36 and there are identical mounting stations spaced around the interior of the cap and associated with each mounting nut 20.

The finger 50 of each retaining member 38 is slidable in the associated opening 52 and has a sharp blade portion 56 formed at its outer end which is adapted to engage the beveled seating surface 58 of the mounting nuts 20.

The retaining members 38 are made of spring-like steel and in their unassembled condition have a shape much as that seen in FIG. 3 with the axially extending portions formed by the shank 40 and leg portion 48 forming a general U-shape affording flexibility at the bent portion 46. The retaining members 38 are assembled by deforming them to position shank 40 in the pocket 42 and the finger 50 in the opening 52 after which the retaining members 38 return to the shape seen in FIG. 3. In this condition the shank 40 prevents radial displacement of the retaining member 38 and the finger 50 prevent axial displacement of the retaining member 38. This securely and resiliently supports the retaining members 38 relative to the cap 32 in both its mounted and unmounted condition.

The trim assembly 10 is attached to the wheel 12 by aligning the cutouts 36 with the wheel fastening nuts 20 and moving the trim assembly 10 axially inwardly of the wheel 12. The blade portions 56 are bent slightly as seen in FIG. 3 and engage the outer ends of the nuts 20 and act as cams to deflect the retaining members 38 radially inwardly and guide the trim assembly. When the trim assembly 10 reaches its mounted position the retaining members 38 flex the finger 50 radially outwardly so that the blade 56 engages the beveled seats 58 and nuts 20. In the mounted position as seen in FIG. 3 axial outward movement of the trim assembly 10 relative to the wheel 12 is resisted by the resiliency of the retaining members 38. Removal of the wheel trim assembly 10 from the wheel 12 is accomplished by placing a prying tool between the lip 54 and the adjoining surface of the wheel 12 and using a prying action to cause the retaining members 38 to deflect radially inwardly.

Figure 2:
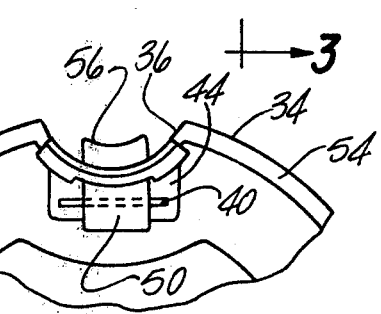
FIG. 2 is a fragmented view of the interior of the cup-shaped wheel trim assembly seen in FIG. 1 showing one retaining member.
Figure 5:
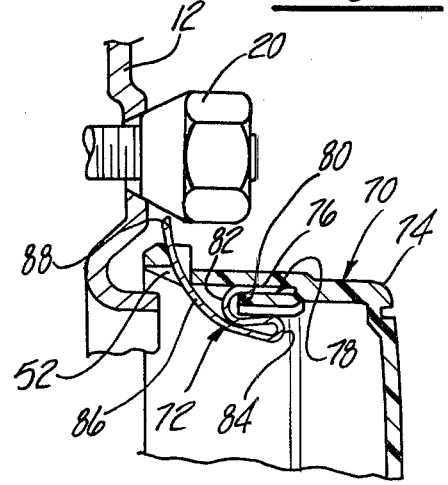
FIGS. 4 and 5 are views similar to FIGS. 2 and 3, respectively, but showing another embodiment of the invention.
Figure 4:
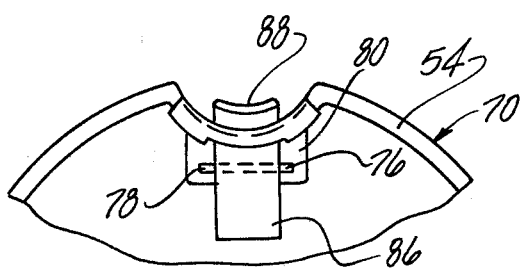

Referring now to FIGS. 4 and 5 another embodiment of the invention is shown in which a wheel trim assembly 70 has a different form of retaining members 72 and the means of mounting them relative to a cap 74. In all other respects, the trim assembly 10 and wheel 12 are the same as in the embodiment in FIGS. 1 through 3.

The retaining member 72 has a shank portion 76 seated in a pocket 78 that open axially outwardly of the cap 74 and is formed in a protruding portion 80 molded integrally on an interior wall of the cap 74. The retaining member 72 is bent at 82 and 84 to form a general S-shape from which a finger 86 extends radially through the opening 52. The end of the finger is formed with a blade portion 88 similar to the blade 56 of the earlier disclosed embodiment. The wheel trim assembly 70 functions in much the same manner as the wheel trim assembly 10 but provides additional flexing points at the bends 82 and 84. The shank 76 in the pocket 78 prevents radial displacement and the finger 86 in the opening 52 prevents axial displacement of the retaining member 72 which remains in position in both the mounted and unmounted condition of the wheel trim assembly 70.

Two embodiments of the wheel trim assembly have been provided in which an ornamental cap made of plastic material is held in position by retaining members made of resilient spring-like metal which engage wheel mounting nuts to hold the wheel trim assembly in position relative to the wheel. The resiliency of the metallic retainer members is used to limit axial and radial movement relative to the ornamental cap to hold the retaining members in position relative to the cap in both the mounted and unmounted condition of the wheel trim assembly.

The embodiments of the invention in which an exclusive property or privilege is claimed are defined as follows:

1. A wheel trim assembly for detachable connection to a vehicle wheel having an outer face with a plurality of uniformly spaced wheel securing fasteners located on a circle concentric with said wheel, said wheel trim comprising: a cup-shaped ornamental trim member adapted to be supported axially of said vehicle wheel, a plurality of mounting stations formed in uniformly spaced relationship within said trim member, each of said stations forming a pair of openings, a first opening of each pair extending in a radial direction through a wall of said cup-shaped trim member and a second opening of each pair extending in an axial direction within said cup-shaped trim member, a plurality of retaining members, each of said retaining members having a radially extending portion slidably disposed in said first opening to project to the exterior of said trim member to limit axial movement of said retaining member and an axially extending portion disposed in said second opening to limit radial movement of said retaining member, and a blade portion formed at the end of each of said radially extending portions of said retaining members to bitingly engage said wheel fasteners for securing said wheel trim.

2. The wheel trim assembly of claim 1 wherein said retaining members are unitary resilient members.

3. The wheel assembly of claim 1 wherein said trim member has an outer wall generally equal to the circle of said fasteners and forming recesses in the outer surface of said wall to afford clearance relative to said fasteners, said retention stations being disposed on the inside of said cup-shaped member opposite to said recesses.

4. The wheel trim assembly of claim 1 wherein the blade portions of said retaining members are disposed in substantially the same plane transverse to the axis of the cup-shaped member.

5. The wheel trim assembly of claim 1 wherein said cup-shaped member is formed of plastic and wherein said retaining members are formed of spring-like material.

6. The wheel trim assembly of claim 1 wherein a lip is formed around the perimeter of the opening to said cup-shaped trim member and said first openings are disposed adjacent said lip.

7. The wheel trim assembly of claim 1 wherein said axially extending portion of said retaining members has an end portion extending axially outwardly.

8. The wheel trim assembly of claim 7 wherein said axially extending portion forms part of a deflectable retainer portion having a generally S-shaped configuration.

9. The wheel trim assembly of claim 1 wherein said retainer members have an end portion extending axially inwardly.

10. The wheel trim assembly of claim 9 wherein said axially extending portion includes a deflectable portion having a generally U-shaped configuration.

* * * * *